(12) United States Patent
Herren et al.

(10) Patent No.: US 6,648,295 B2
(45) Date of Patent: Nov. 18, 2003

(54) VIBRATION AND SOUND DAMPENER FOR HEAVY MACHINERY

(76) Inventors: Andrew James Herren, 1160 N. Blue Gum Ave., Anaheim, CA (US) 92806; Joel Barron, 1160 N. Blue Gum Ave., Anaheim, CA (US) 92806

( * ) Notice: Subject to any disclaimer, the term of this patent is extended or adjusted under 35 U.S.C. 154(b) by 0 days.

(21) Appl. No.: 09/970,057

(22) Filed: Oct. 2, 2001

(65) Prior Publication Data

US 2003/0071187 A1 Apr. 17, 2003

(51) Int. Cl.[7] .............................................. E04H 9/02
(52) U.S. Cl. ........................ 248/636; 248/562; 248/638
(58) Field of Search ................................ 248/618, 632, 248/634, 636, 638, 560, 562, 559; 52/167.6

(56) References Cited

U.S. PATENT DOCUMENTS

| | | | | |
|---|---|---|---|---|
| 3,771,549 A | * | 11/1973 | Lemon et al. .............. 137/393 |
| 4,036,335 A | * | 7/1977 | Thompson et al. ....... 188/282.9 |
| 4,565,039 A | * | 1/1986 | Oguro et al. ............... 248/567 |
| 4,595,166 A | * | 6/1986 | Kurokawa ................... 188/267 |
| 5,497,858 A | * | 3/1996 | Cloud et al. ................. 188/67 |
| 5,765,800 A | | 6/1998 | Watanabe |
| 5,816,559 A | * | 10/1998 | Fujimoto .................... 248/562 |
| 5,876,012 A | | 3/1999 | Haga |
| 5,941,351 A | * | 8/1999 | Etnyre .................... 188/322.17 |
| 6,036,162 A | * | 3/2000 | Hayashi ...................... 248/550 |

OTHER PUBLICATIONS

Enidine, Air Springs Product Catalog and Selection Guide.

* cited by examiner

*Primary Examiner*—Leslie A. Braun
*Assistant Examiner*—Tan Le
(74) *Attorney, Agent, or Firm*—Mark H. Plager (57) ABSTRACT

The present invention relates to an apparatus that will dampen vibration and sound created by heavy machinery, such as metal presses, metal stampers, and HVAC units, as well as limit lateral movement of the heavy machinery based upon a combination of a multiplicity of air springs and rigid cylinders. The present invention provides the simplest method of dampening vibrations and sounds created by heavy machinery. The present invention further prevents lateral movement of the machinery, while simultaneously providing a means to protect such machinery against seismic events by absorbing the seismic forces.

2 Claims, 6 Drawing Sheets

VIBRATION AND SOUND DAMPENER FOR HEAVY MACHINERY

CROSS-REFERENCES TO RELATED APPLICATIONS

None.

BACKGROUND OF THE INVENTION

1. Field of the Invention

The present invention relates to an apparatus that dampens vibration and sound created by heavy machinery installed thereon, as well as limits lateral movement. Particularly, the apparatus relates to a sound and vibration dampener for metal presses, metal stampers and roof top heating, ventilation and air conditioning (HVAC) units using air springs and rigid metal cylinders integrated into to upper and lower platforms which are attached to the object machinery and floor. The present invention provides the simplest method of dampening vibrations and sounds created by such heavy machinery. The invention further prevents lateral movement of the machinery as a result of vibrations. Furthermore the invention provides a means to protect the object machinery against seismic forces by absorbing the seismic force.

2. Description of Prior Art

It is common problem when utilizing metal presses, stamping machines and HVAC units that the machinery creates ambient noise and vibration. Generally, metal presses and stamping machines are seated or attached directly to the floor. Consequently, the vibration of the machine is transferred directly to the floor. In the absence of a means to dissipate the vibration, noise is also created. Moreover, the vibration generated by the machine results in undue stress to both the floor and the machine unless dissipated. This resulting stress will inevitably weaken or crack the machinery and floor, and undoubtly cause mechanical failures if the vibrations are not dissipated.

It is also a common problem with heating, ventilation and air conditioning (HVAC) units that ambient noise and vibrations are created from the units' compressors. This is especially true with respect to HVAC units which are mounted directly to the roof of a building. Generally, absent a means to dissipate vibrations created by roof-top HVAC units, the underlying building structure absorbs the vibrations, consequently resulting in vibrations within the buildings which tend to be annoying to the building's occupants. Moreover, the continuous shaking of the building's roof and superstructure by the HVAC unit results in weakening of the roof structure and building structure, possibly resulting in the collapse of either the roof or the building.

Historically, vibrations and sounds of large machinery, such as metal presses and metal stamping machines, were dissipated with the use of isolation pits or chambers. Isolation pits were either created by: (1) excavating a pit in the factory floor; or (2) building a room above ground and lining the walls with sound and vibration dampening material such as acoustic tiles. The installation of either a subterranean or an above-ground isolation room is quite expensive and labor intensive.

The claimed invention is an improvement over the prior art based upon the accomplishment of vibration and sound dampening using a less costly means and materials. It is a further improvement over the prior art based upon ease of construction and installation of the sound and vibration dampening device.

First, the claimed invention provides for dampening of vibrations caused by the machinery. The device absorbs and dissipates the vibration of the machine caused by each stroke of the press.

Second, the claimed invention provides for dampening of sound caused by the machinery. By absorbing the vibrations created by each stroke of the object machinery, the sound radiated from the machinery is concomitantly dampened.

Third, the invention stabilizes the machinery against lateral movement.

Fourth, the claimed invention serves as means to stabilize machinery during seismic events. The invention allows the machinery to rise and fall in the vertical plane without lateral movement in the horizontal plane. Consequently, the seismic forces are absorbed by the invention without damage to the object machinery installed thereupon.

A search of the prior art did not disclose any patents or other prior art references that read directly on the claims of the instant invention. However, the following patents were considered related:

| U.S. Pat. No. | Inventor | Issue Date |
| --- | --- | --- |
| 5,876,012 | Haga | Mar. 2, 1999 |
| 5,765,800 | Watanabe | Jun. 16, 1998 |

Inventors have devised other vibration dampening and cancellation apparatus such as U.S. Pat. Nos. 5,876,012 and 5,765,800. However, these prior art inventions do not accommodate large metal presses and stampers or prevent the potential lateral movement as a result of the machinery or seismic events which would damage the machinery and dies used therein. The inclusion of rigid metal cylinders around the air springs of the instant invention provides sufficient support to the air springs to support large heavy machinery, including but not limited to metal presses, metal stamps and Heating, Ventilation and Air Conditioning Units. Furthermore, inclusion of rigid metal cylinders around the air springs of the instant invention abates all lateral movement of the object machine due to operation of the machine or seismic forces unlike the prior art which has no means to prevent lateral movement. To aid the vertical movement of the instant invention either polytetraflouroethylene or ball bearings is incorporated between the rigid cylinders to reduce friction to allow the invention and the object machinery to float without interference thereby allowing the air springs to dissipate the resulting noise and vibration from each stroke of the object machinery.

SUMMARY OF THE INVENTION

The invention disclosed by this patent discloses an apparatus for dampening noise and vibrations caused by heavy machinery such as metal stampers, metal presses, and HVAC units.

The claimed invention comprises a basically rectangular shape upper platform, which may be modified to mirror the base of machinery placed on top of the upper platform. A lower platform which mirrors the shape of the upper platform. Fixedly attached between the upper platform and lower platform are a multiplicity of sound and vibration dampeners. The sound and vibration dampener comprises a male cylinder slideably inserted into female metal cylinder. The female metal cylinder incorporates friction resistant material on the inner wall to allow the male cylinder to slide freely in a vertical motion within the female cylinder. An air spring disposed in the chamber created by the male cylinder and female cylinder when joined together thereby forming a sound and vibration dampener attached between the upper platform and lower platform.

The claimed invention is an improvement over the prior art based upon the accomplishment of vibration and sound dampening using a less costly means and materials. It is a further improvement over the prior art based upon ease of construction and installation of the sound and vibration dampening device. Further objects of this invention are as follows:

(a) the claimed invention provides for dampening of vibrations caused by heavy machinery by absorbing and dissipating the vibration of the machine caused by each stroke of the press;

(b) by absorbing the vibrations created by each stroke of the object machinery, the sound radiated from the machinery is concomitantly dampened;

(c) the invention stabilizes the machinery against lateral movement while permitting vertical movement to attenuate sound and vibrations; and (d) the claimed invention serves as means to stabilize machinery during seismic events. The invention allows the machinery to rise and fall in the vertical plane without lateral movement. Consequently, the seismic forces are absorbed by the invention without damage to the object machinery installed thereupon.

These together with other objects of the invention, along with various features of novelty which characterize the invention, are pointed out with particularity in the claims annexed to and forming part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

These and other objects and advantages of the invention will be more readily apparent when considered in relation to the preferred embodiments of the invention as set forth in the specification and shown in the drawings. Referring now to the drawings which illustrate the invention as follows.

| Reference Numbers In Drawings | |
|---|---|
| 10 | upper platform |
| 11 | lower platform |
| 15 | male cylinder |
| 16 | female cylinder |
| 20 | Friction reduction means |
| 21 | Teflon ® strip |
| 22 | Teflon ® strip anchor screw |
| 23 | ball bearings |
| 24 | vertical ball bearing groove |
| 25 | seal of the vertical ball bearing groove |
| 30 | air spring |
| 31 | air pressure valve |
| 35 | anchor screws |
| 40 | vibration sound dampener |
| 100 | object machinery |

DETAILED DESCRIPTION OF THE PREFERRED EMBODIMENT

Figure 1:
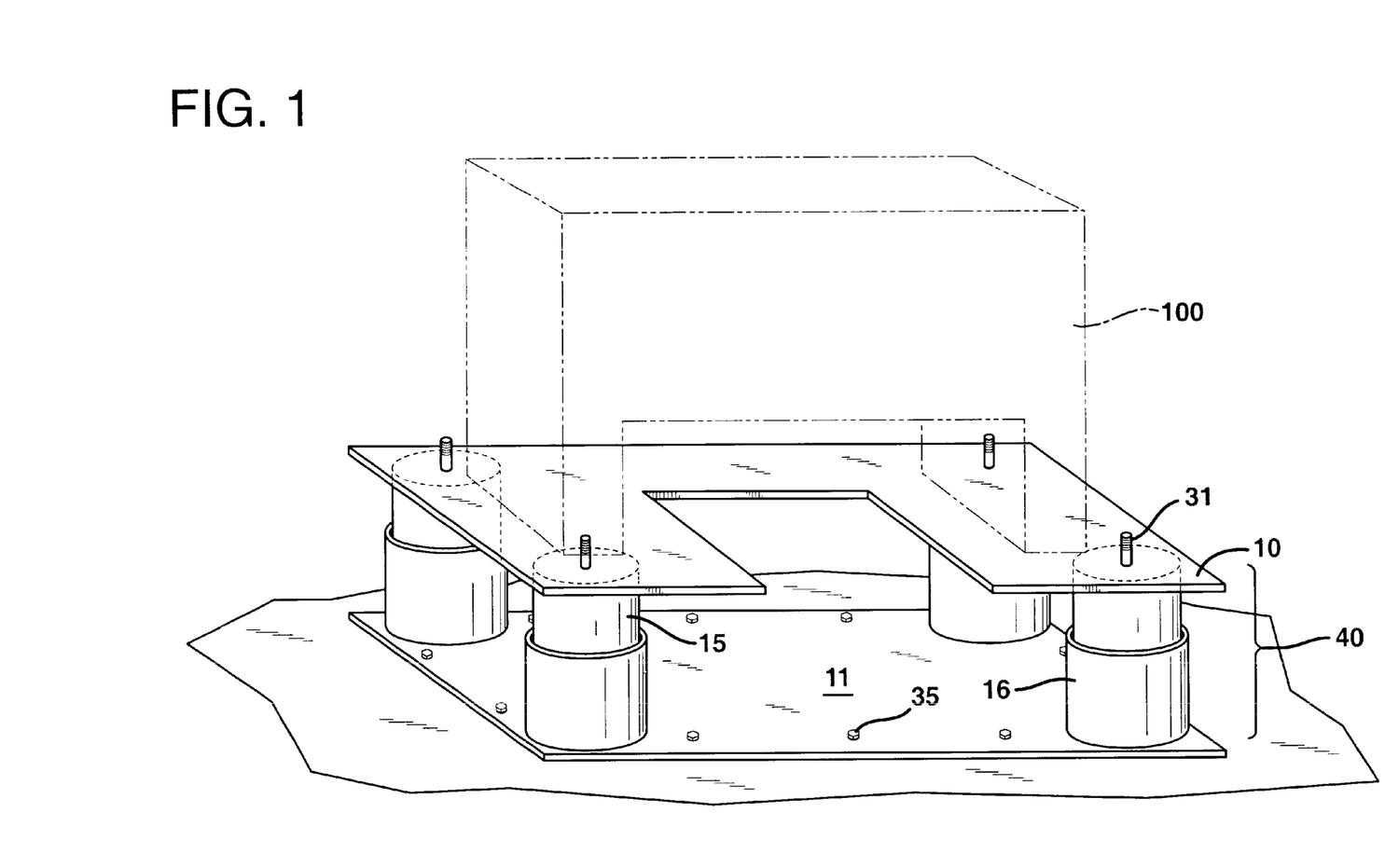
FIG. 1 is a perspective view of the invention with object machinery attached thereto.

Referring now to the drawings, the claimed device is illustrated by FIG. 1. The claimed invention is best fabricated using galvanized steel.

The device depicted in FIG. 1 comprises an upper platform (10) and a lower platform (11) with a multiplicity of sound and vibration reducing means (40) attached between the upper platform and lower platform. It is preferred that the upper platform (10) and lower platform (11) are fabricate from steel which is no thinner than one-half inch in thickness when a 100 ton press is the object machine thereon. Generally, the thickness of the metal will be proportional to the weight of the object machinery.

It is preferred that the size of the upper and lower platforms comprise a square of six foot by six foot. Generally, however, the size of the platforms will be controlled by the size of the object machinery (100). In the event the object machinery (100) placed on the upper platform (10) is a metal stamper which produces a metal slug by-product, it is anticipated that the upper platform will be notched, forming a u-shaped platform, to permit the placement of a catch basin on the lower platform to receive the metal slugs for disposal.

Disposed between the upper platform (10) and lower platform (11) are a plurality of sound and vibration dampeners (40) operative in the vertical direction. Additional or less sound and vibration dampeners may be used in the instant invention. However, it is preferred that at least one sound and vibration dampener (40) is installed between the upper platform and lower platform at their four corners.

The sound and vibration dampener (40) comprise an air spring (30) fixedly attached to the upper side of the lower platform (11) disposed within the cavity of the female cylinder (16) which is also fixedly attached to the upper side of the lower platform (11). It is preferred that he male cylinder (15) is welded to the lower side of the upper platform (10). The male cylinder (15) is fixedly attached to the underside of the upper platform (10). It is preferred that the female cylinder (16) is welded to the upperside of the lower platform (11).

Figure 7:
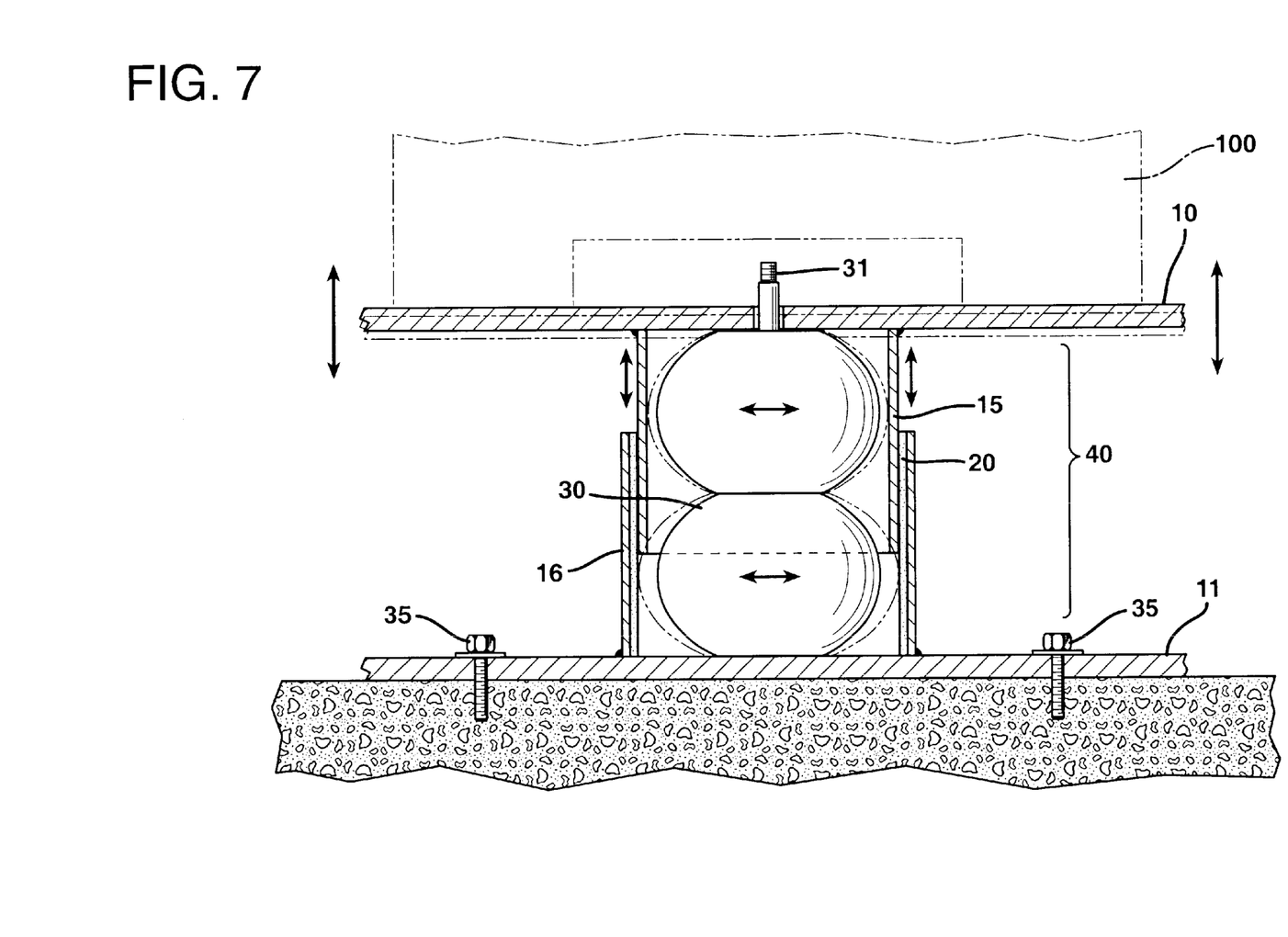
FIG. 7 is close-up cross sectional view of the invention depicted in FIG. 1.

The male cylinder (15) with the air spring (30) disposed therein is slideably inserted into the cavity of the female cylinder (16) to accommodate vertical movement of the female cylinder (16) relative the male cylinder (15). The air spring (30) is fixedly attached to upperside of the lower platform (11) and the air pressure valve (31) of the air spring protrudes through the upper platform (10) to permit manual variation of the air pressure in the air spring in relation to the object machinery (100). The male cylinder (15) and female cylinder (16) which encase the air spring (30) provide lateral stability to the air spring and the invention as a whole. It is preferred that a two inch clearance in the diameter of the inner wall of the male cylinder from the air shock be present prevent abrasion and wear of the air shock in its compressed state as depicted in FIG. 7.

The thickness and diameter of the male cylinder (15) and female cylinder (16) is dependant upon the size of the air spring necessary to support and absorb the vibrations from the object machinery.

Air pressure in the air spring (30) is manually altered by the user to conform to the weight of the object machine (100) installed on the upper platform (10). Generally, as the weight of the object machinery (100) increases, the pressure necessary to effectuate the air springs (30) must proportionally increased. It is preferred that the air spring (30) comprise a double bellows type over a single bellows type of air spring. Determination of the requisite air spring for utilization as sound and vibration dampener in this invention may be determined using standard equations for the selection of air springs recommended by air spring manufacturers.

Figure 2:
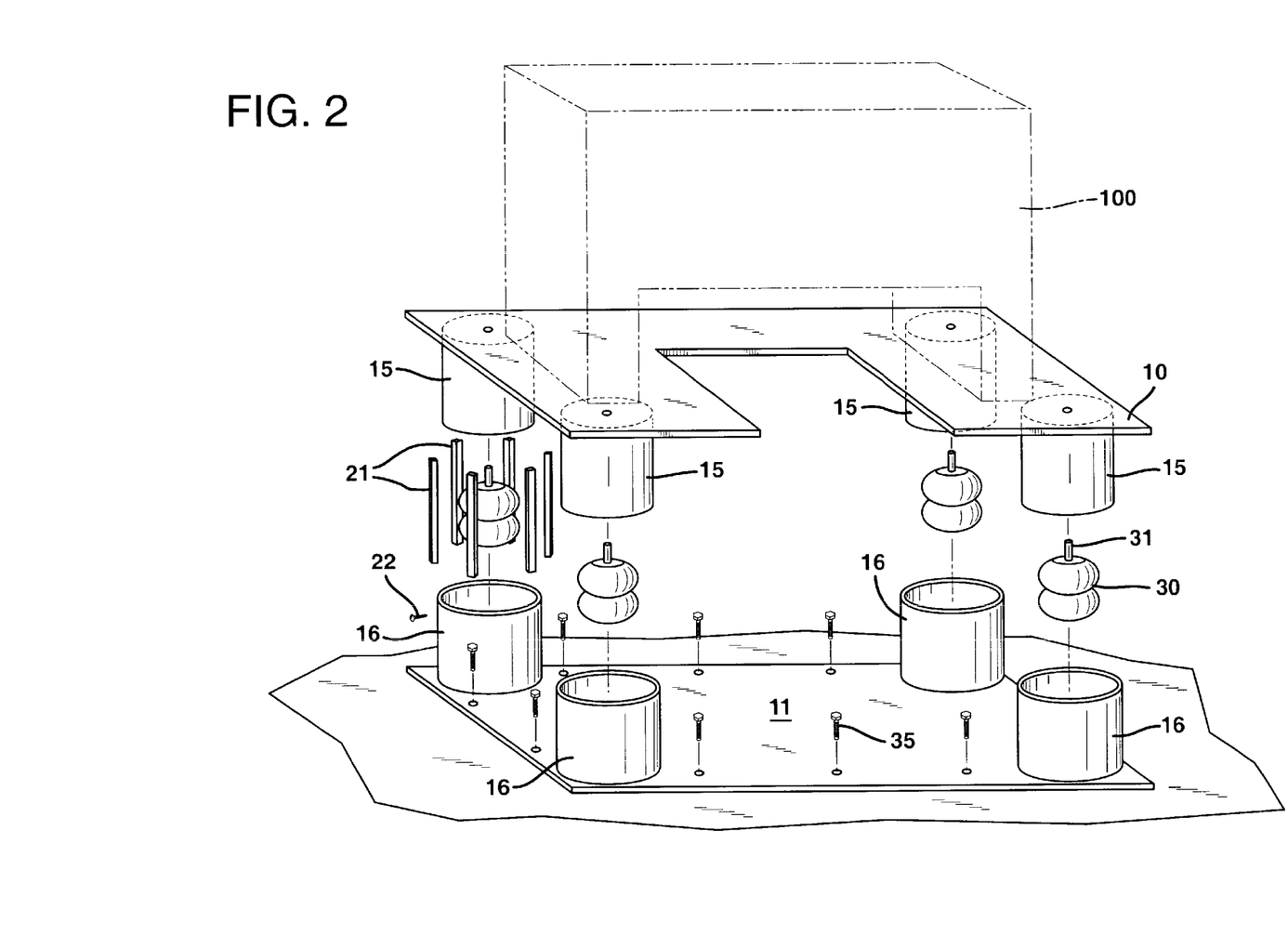
FIG. 2 is an exploded view of the invention incorporating polytetraflouroethylene strips.
Figure 3:
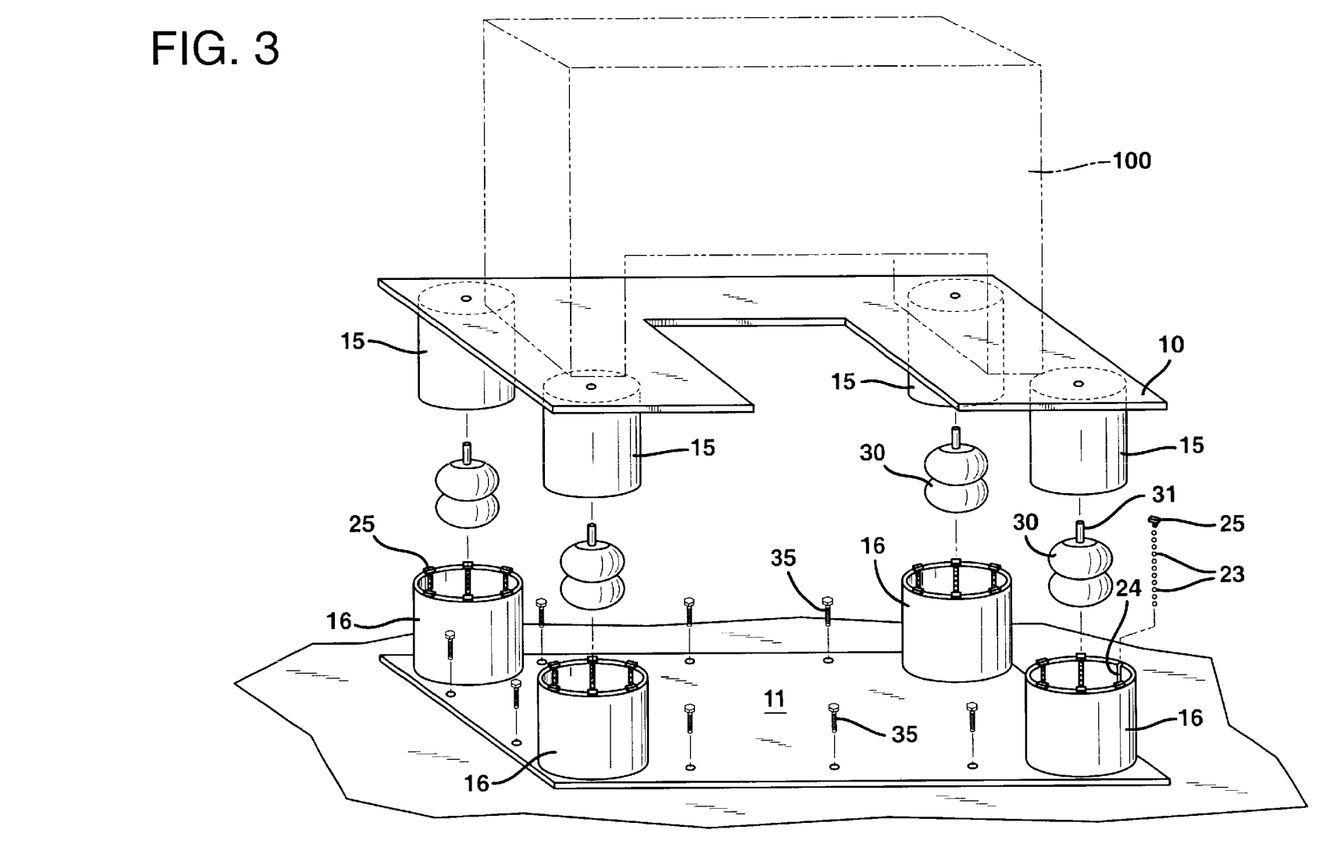
FIG. 3 is an exploded view of the sound and vibration dampener incorporating ball bearings.

To assist the vertical movement of the male cylinder (15) within the female cylinder (16) a friction reduction means is incorporated therein. The friction reduction means comprises either: (a) multiplicity of polytetraflourethylene strips (22) incorporated between the male cylinder (15) and female cylinder (16) as depicted in FIGS. 2 and 4; or (b) a multiplicity of steel ball bearings (23) incorporated in a plurality of parallel vertical grooves (24) on the inside surface of the female cylinder as depicted in FIGS. 3, 4 and 5.

Figure 4:
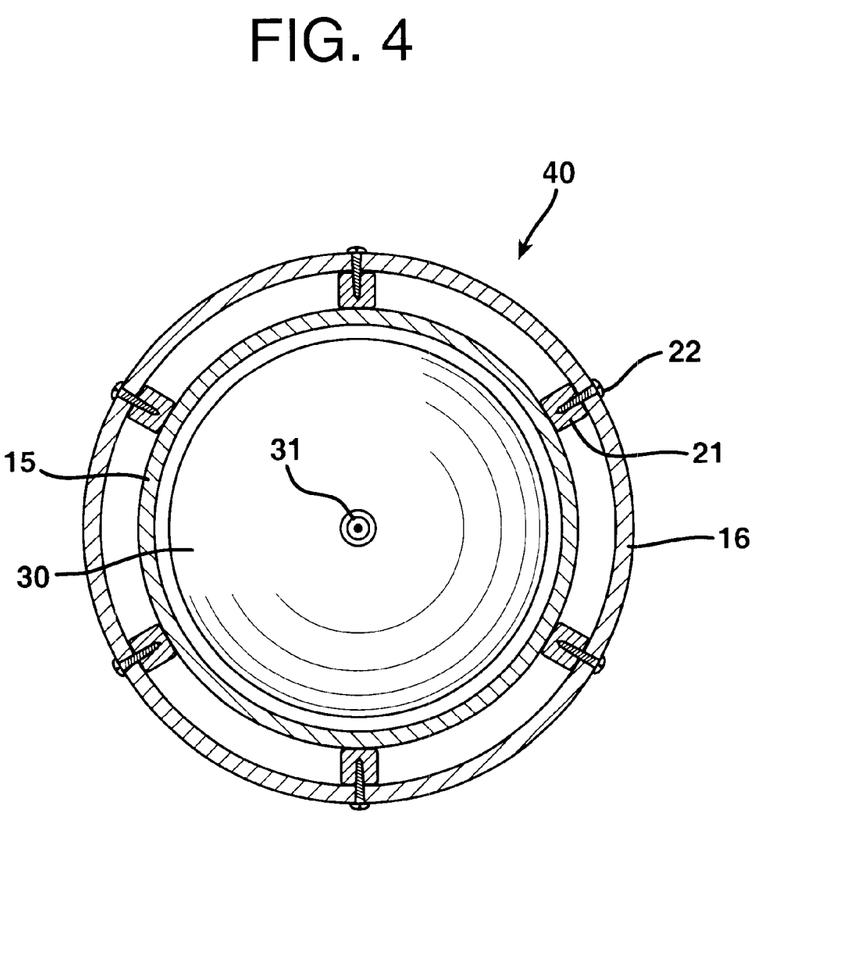
FIG. 4 is a top view of the sound and vibration dampener incorporating polytetraflouroethylene strips.
Figure 5:
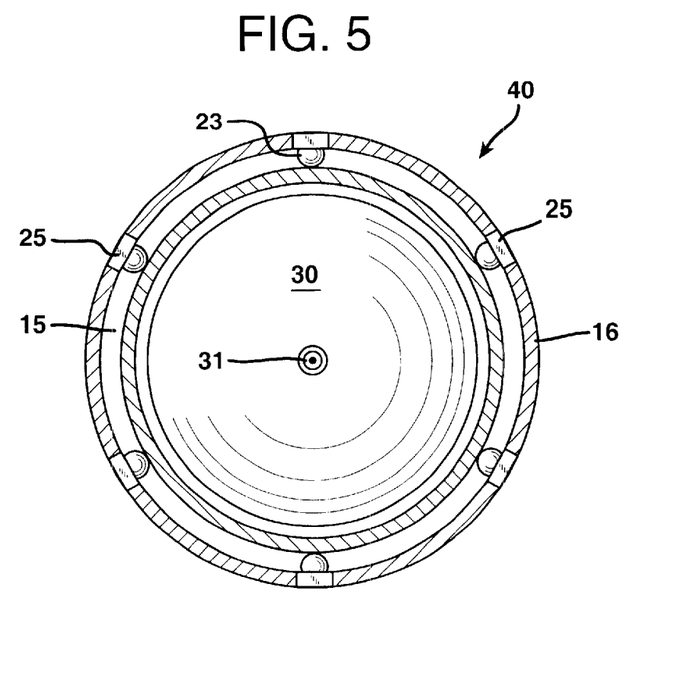
FIG. 5 is a top view of the sound and vibration dampener incorporating ball bearings.

When utilizing polytetraflourethylene strips (21) in lieu of the other friction reduction means, it is preferred that at least six polytetraflourethylene strips are incorporated equidistant around the circumference of the female cylinder as depicted in FIG. 4. It is preferred that the minimum thickness of polytetraflourethylene used is a quarter inch. The polytetraflourethylene strips are fixedly attached to the inside surface of the female cylinder using self tapping screws (22) inserted from the outside surface of the female cylinder. The screws do not completely penetrate through the polytetraflourethylene strips, but rather penetrate sufficiently, approximately half way, to secure the polytetraflourethylene strips to the inner surface of the female cylinder (16) as depicted in FIG. 4. As the polytetraflourethylene strips wear from use, the screw tip will become exposed to the exterior of the male cylinder (15) thereby resulting in a distinctive scratching noise of metal against metal which notifies the user that the polytetraflourethylene strips and screws must be replaced with new polytetraflourethylene strips and new screws.

Figure 6:
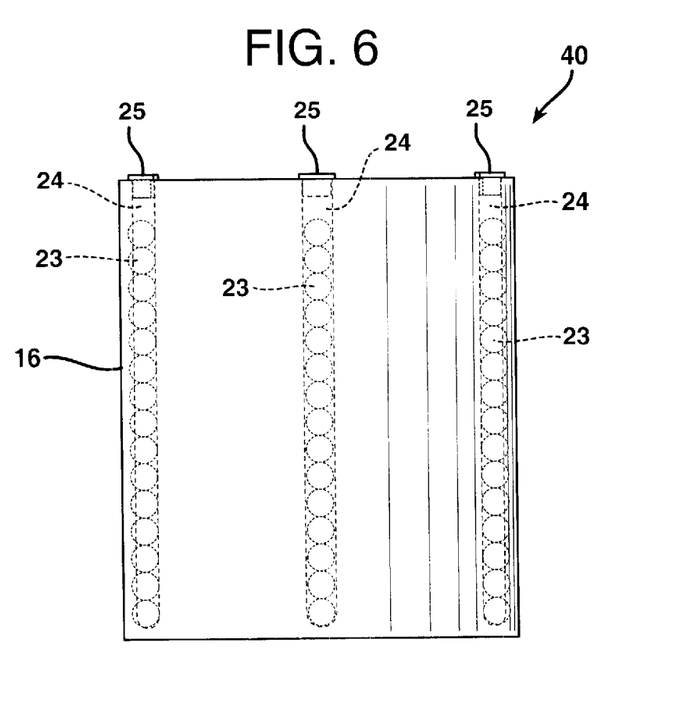
FIG. 6 is a cross-sectional view of the sound vibration dampener in FIG. 5 which incorporates ball bearings.

Utilization of ball bearings (23) in lieu of polytetraflourethylene strips requires the creation of an equal number of vertical grooves (24) which are equidistant around the inner surface of the female cylinder to insert the ball bearings as depicted in FIG. 6. The width and depth of the ball bearing grooves will increase in proportion to the size and thickness of the female cylinder. Likewise, as the width and depth of the ball bearing groove increases so too will the size of the ball bearing. The preferred method of creating the vertical grooves is electric discharge machining, also known as EDM. The grooves (24) containing the ball bearings are sealed at the top (25) to prevent the ball bearings from escaping from the groove. The seal of the ball bearing groove may be a welded piece of metal, or preferably a removeable rubber stopper which may be fastened in place with a screw. The ball bearings are preferably manufactured from steel, and easily replaceable upon removal of the seal (25) of the vertical ball bearing groove.

To insure safe operation of this invention, it is preferred that the object machinery (100) is fixedly attached to the upper platform (10) using metal bolts, and the lower platform (11) is also fixedly attached to the floor using a multiplicity of bolts or screws (35). By securing the object machine (100) to the invention, and securing the invention to the floor, this will prevent the object machine and invention from tipping over or moving from its designated location during actual use.

Although certain preferred embodiments of the present invention have been shown and described in detail, it should be understood that various changes and modifications may be made therein without departing from the scope the appended claims.

We claim:

1. A vibration and sound dampener for heavy machinery comprising a lower platform having an upper surface and a lower surface, an upper platform having an upper and a lower surface and for supporting an object to be mounted on the upper surface thereof, a multiplicity of vibration and sound isolation means provided on the upper surface of said lower platform and for supporting the lower surface of said upper platform horizontally in a floating state, the improvement comprising:

a male cylinder possessing an outer wall surface and an inner wall surface fixedly attached to the lower surface of said upper platform surrounding said vibration and sound isolation means;

a female cylinder with an outer wall surface and an inner wall surface fixedly attached to the upper surface of said lower platform and slidably mounted around said male cylinder to allow vertical movement and prevent lateral movement of said upper platform;

a means for indicating replacement of a plurality of polytetraflouroethylene strips removably attached equidistant along said interior wall of said female cylinder to accommodate vertical movement of said female cylinder relative to said male cylinder, wherein said means for indicating the necessity for replacing eroded polytetraflouroethylene strips comprises metal fasteners which partially penetrate said polyflouroethylene strips thereby serving as an indicator to change the polytetraflouroethylene strips when said polytetraflouroethylene are eroded from use thereby creating a distinctive scratching sound indicating the necessity to replace the worn polytetraflouroethylene strips.

2. A vibration and sound dampener for heavy machinery comprising a lower platform having an upper and a lower surface, an upper platform having an upper and a lower surface and for supporting an object to be mounted on the upper surface thereof, a multiplicity of vibration and sound isolation means provided on the upper surface of said lower platform and for supporting the lower surface of said upper platform horizontally in a floating state, the improvement comprising:

a male cylinder possessing an outer wall surface and an inner wall surface fixedly attached to the lower surface of said upper platform surrounding said vibration and sound isolation means;

a female cylinder with an outer wall surface and an inner wall surface fixedly attached to the upper surface of said lower platform and slidably mounted around said male cylinder to allow vertical movement and prevent lateral movement of said upper platform;

a multiplicity of vertical grooves permanently sealed at the upper end placed equidistant around said inner wall of said female cylinder; a plurality of ball bearings rotatably fixed within said vertical grooves of said inner wall of said female cylinder, and an upper seal of said vertical groove which is removable to permit replacement of said ball bearings.

* * * * *